March 22, 1949.
G. HERZOG
2,464,930
METHOD AND APPARATUS FOR DETERMINING
THE INCLINATION OF SUBSTRATA
Filed Jan. 12, 1944
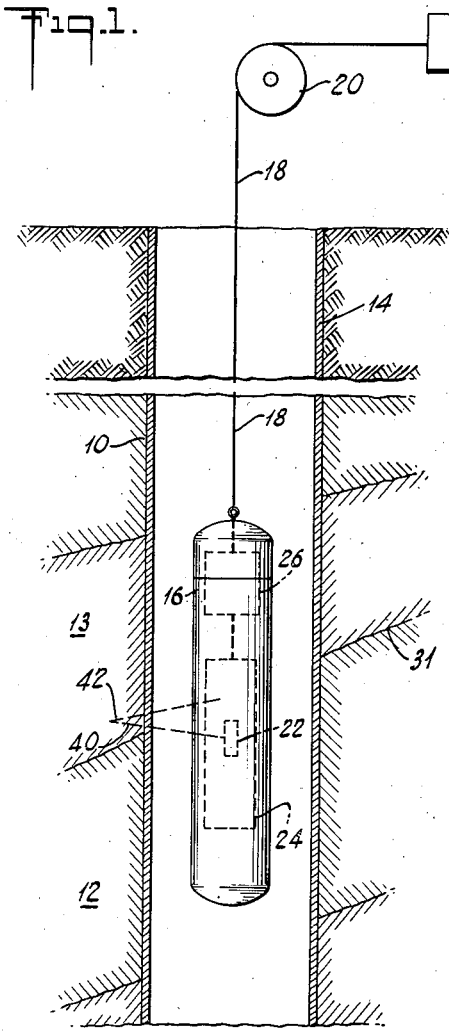
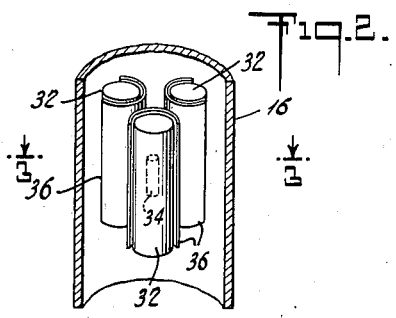
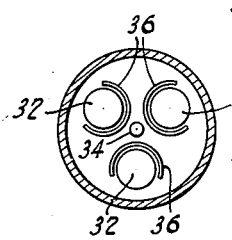
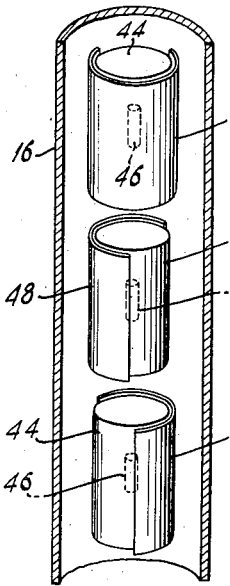
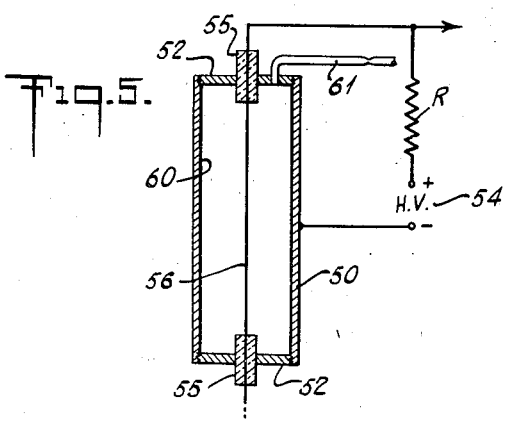
INVENTOR
GERHARD HERZOG.
BY
ATTORNEY Patented Mar. 22, 1949

2,464,930

UNITED STATES PATENT OFFICE 2,464,930

METHOD AND APPARATUS FOR DETERMINING THE INCLINATION OF SUBSTRATA

Gerhard Herzog, Houston, Tex., assignor to The Texas Company, New York, N. Y., a corporation of Delaware Application January 12, 1944, Serial No. 517,960

8 Claims. (Cl. 250—83.6)

This invention relates to determinations of the nature of substrata and more particularly to a method and an apparatus for measuring the inclination or dip of a formation or stratum traversed by a bore hole or a well.

The principal object of the invention is to provide an effective way of accurately measuring the angle of inclination of a formation from within a bore hole, which may be either cased or uncased, by taking readings from an instrument lowered or raised through the hole suspended from a wire cable.

Various suggestions have been proposed and put into use with varying degrees of success for measuring the inclination or dip of substrata. The taking of side wall core samples to determine whether a formation on one side of the hole is higher or lower than on the opposite side is, of course, a time consuming and expensive operation and the results obtained are usually not commensurate with the cost. The taking of side wall cores is possible, of course, only in uncased holes. Likewise, the electrical logging methods are limited in their use to holes where no casing has been placed opposite the formation which it is desired to examine.

In accordance with the present invention, a source of penetrative radiation, such as neutrons, is mounted in a suitable housing adapted to be lowered and raised through a bore hole while suspended from a cable. Associated with the source within the housing is a plurality of radiation detectors, preferably proportional counters, which are responsive to variations in the amount of neutrons or gamma rays scattered within the formations surrounding the hole and arising from the bombardment of these formations by radiation from the source. Fast neutrons, for example, from the source penetrate the formations wherein some of the neutrons are scattered and slowed down and returned to the detectors in the hole. Again, the bombardment of the formations by neutrons may cause gamma rays to be released in the formations and the intensity of these rays which may return to the hole may be measured by means of the detectors.

It is preferred that at least three detectors be utilized and these may be disposed substantially in a horizontal plane and separated angularly around a centrally disposed neutron source. Each detector is provided along its rear side with a radiation shield member so that each detector will respond primarily to radiation returning to the hole from a different direction. In other words, where three detectors are used, the shields are preferably positioned so that each detector will respond to the radiation reaching the hole from a 120° or smaller sector of the surrounding formations. The output of each of the detectors is conducted either with or without preamplification upwardly through the cable to an amplifier at the surface, the output of which passes to a suitable recording instrument. When the housing is placed in the hole opposite the boundary between adjacent sloping formations which react differently to neutron bombardment, the response of each detector will depend upon the nature of the formation which is opposite that detector, and, from the simultaneous record which is made from the individual outputs of the three detectors, the amount of inclination of the formations can be ascertained.

In another embodiment of the invention three detectors are placed in vertical alignment within the housing and either a single source of radiation is disposed at the center of the middle detector, or a separate source is mounted within or near each detector. As is the case with the arrangement described in the preceding paragraph, each detector is provided with a shield along one side and these shields are oriented so that each detector will be responsive to radiation reaching the hole from substantially a 120° or smaller sector of the formation opposite the detector. In this embodiment the detectors may, of course, be larger in diameter than in the case where all three are arranged in the same horizontal plane.

For a better understanding of the invention reference may be had to the accompanying drawing in which Fig. 1 is a sectional elevation through a bore hole penetrating a portion of the earth's strata;

Fig. 2 is a sectional elevation through that portion of the instrument housing containing the radiation source and detectors;

Fig. 3 is a sectional view on the line 3—3 of Fig. 2;

Fig. 4 is a view somewhat similar to Fig. 2 but showing three detectors arranged in vertical alignment; and Fig. 5 is a diagrammatic illustration of a single detector of the proportional counter type.

Referring to the drawing, a bore hole 10 is shown as traversing several underground formations two of which are shown at 12 and 13. A casing 14 is shown within the hole and a housing 16 is suspended therein from a cable 18, the cable passing over the pulley or drum of a device 20 which indicates the depth of the housing 16 in the hole. Within the housing 16, a source 22 of penetrative radiation such as neutrons is mounted, together with a system of radiation detectors indicated by the dotted line 24. The output of the detectors may be conducted to a linear preamplifier 26, the output of which is conducted upwardly through the cable 18 to another amplifier 28, preferably of the linear type, which in turn is connected to a suitable recording instrument 30. It will be noted that, as shown in Fig. 1, the detectors 24 are in a position substantially opposite the boundary or interface 31 between the formation 12 and the adjacent formation 13.

In Figs. 2 and 3 three detectors 32 are shown as being disposed in parallel in a horizontal plane. The detectors 32 are co-extensive in their vertical position and are arranged angularly about a centrally disposed source 34 of penetrative radiation such as neutrons. Each detector 32 is provided with a curved shield 36, preferably of cadmium and each shield is positioned so that its corresponding detector will respond only to radiation from a predetermined direction. Thus, with three detectors, it is preferred that each one will respond to radiation coming to the hole from a sector of the formation faced by the unshielded portion of that detector and spaced 120° from the sectors faced by the other detectors.

It will be seen that with a system of detectors, as is shown in Fig. 2, disposed in the hole 10 opposite the boundary or interface 31, fast neutrons from the source will pass outwardly in all directions through the shields 36, detectors 32, housing 16 and well casing 14 into the formations surrounding the hole, in which formations some of the neutrons will be scattered and slowed down and returned to the interior of the housing 16. A neutron shown diagrammatically by the dotted line 40 penetrating the formation 13 may be slowed down by collision with an atom of the material constituting that formation and after being slowed down may return to the housing as indicated by the dotted line 42. Upon entering the housing 16, the slow neutron will strike the unshielded portion of one of the detectors 32 with a resultant ionizing of gas in the detector, as will be explained hereinafter, causing the detector to discharge. The slow neutron 42 will not affect either of the other two detectors since it must strike one of the cadmium shields 36 wherein it will be absorbed. A neutron passing to the right from the source in Fig. 1 will penetrate the formation 12 and a returning slow neutron will strike and may cause ionization on one of the other two detectors 32. Since the amount of neutrons scattered and slowed down in the various formations such as 12 and 13 depends upon the nature, or rather the constituency, of these formations, a record made of the response of the three detectors 32 by the recorder 30 at the surface will serve to indicate which formation, i. e., 12 or 13, is opposite each detector and from this data the inclination or slope of the boundary 31 can be ascertained.

In Fig. 4 a series of three detectors 44 similar to but larger than the detectors 32 is shown in vertical alignment within the housing 16 and preferably at the center of each detector is a separate source 46 of penetrative radiation such as neutrons. Each of the detectors 44 is provided at one side with a curved cadmium shield 48 similar to the shields 36 of Fig. 2 and disposed so that each detector 44 will be responsive to radiation coming from substantially a 120° or smaller sector of the formation opposite its unshielded side. With the arrangement shown in Fig. 4, the detectors 44 can be considerably larger than the detectors 32 and thus greater sensitivity may be attained. If desired a single neutron source can be mounted within the middle detector.

The operation of the detector system of Fig. 4 is substantially the same as has been described, the output of each detector 44 being transmitted to the surface and to a recording instrument 30. With this form there will be a uniform shift of the records or traces from the counters owing to the vertical separation or displacement of the counters with respect to each other.

As stated hereinbefore, it is preferred that each of the radiation detectors 32 or 44 be constituted as a proportional counter and Fig. 5 is a diagrammatical illustration of a device of this type. The counter comprises a cylinder 50 and end closures 52. The cylinder 50 comprises the cathode of the device and is connected electrically to one side of a high voltage source 54. Disposed along the longitudinal axis of the cylinder 50 between insulators 55 is a wire 56 forming the anode. The insulators 55 may be glass tubes mounted in the end members 52 which are screwed into the cylinder 50. A fairly high electrical resistance R is connected between the other side of the high voltage source 54 and the anode 52, the anode preferably being maintained at a positive potential with respect to the cathode. It has been found that a potential difference of the order of 1000 volts is satisfactory. The cylinder 50 is shown as lined with a coating 60 of a suitable neutron-reactive material, preferably a compound of boron or lithium, such as, for instance, boron carbide. A suitable gas having low density is used to fill the counter through the filling tube 61 to a pressure of about two inches of mercury and it has been found that a hydrocarbon such as methane is satisfactory. In a slightly different form of proportional counter the coating 60 is dispensed with and a neutron-reactive gas such as boron trifluoride at a pressure of about two inches of mercury may be used as a counter filling. If desired, both of these forms of counters can be combined; i. e., the boron carbide coating can be used together with a boron trifluoride filling. The operation of the proportional counter will be understood from the following comparison with other types of radiation detectors.

The actions of an ionization chamber, a proportional counter, and a Geiger-Muller counter differ as follows: In all three cases ions are set free in the gas within the detector through the action of the rays. This ionizing may be a direct ionization of the gas or it may be a secondary ionization of the gas due to the action of charged particles which are emitted from the walls of the container or from the gas filling. In all three devices the ions are collected at the electrodes, but in the Geiger-Muller counter and in the proportional counter a multiplication of the ions occurs within the detector. Due to this multiplication, the charge which is collected is much larger in the cases of the Geiger-Muller counter and the proportional counter than in the ionization chamber. The charge collected may or may not be dependent on the number of primary ions which are formed in the gas by one individual ray. In a Geiger-Muller counter this multiplication results in a charge the size of which is independent of the number of ions formed by one ray; in a proportional counter, however, the charge is proportional to the number of ions formed. The result is, therefore, that the size of the charge pulses in a proportional counter varies with the effectiveness of the ionizing rays.

The number of these pulses is a measure of the number of such rays, i. e., of the intensity of the rays. It is therefore possible with a proportional counter to distinguish between rays which produce different amounts of primary ionization.

Neutrons do not ionize at all and in order to detect neutrons one has to use an intermediate reaction by which the neutrons release an ionizing particle which in turn acts on the gas of the proportional counter. Such reactions are known to occur with, for example, lithium and boron. A proportional counter can, as stated hereinbefore, either be filled with a gas, such as boron trifluoride which contains a compound of one of these elements, or the wall of the counter can be lined or coated with the elements or their compounds, or both the neutron-reactive wall coating and the neutron-reactive gas can be used. In these reactions alpha particles are emitted under the action of the neutrons whereas gamma rays release electrons. The specific ionization of alpha rays is much greater than that of electrons; therefore, the charge pulses in the proportional counter are larger if they are due to neutrons than if due to gamma rays. By selecting the pulse size with suitable electrical circuits one can therefore distinguish between the neutrons and the gamma rays.

It is preferred that both the preamplifier 26 and the amplifier 28, shown in Fig. 1, be linear as by this means the discharges or pulses of the detectors 32 or 44 resulting from neutron reaction can be distinguished from discharges caused by gamma rays striking the counters.

If it is desired to determine both the strike and the inclination or dip of a formation, such as the formation 12, this can be done in various ways such as by the use of a magnetic compass in the housing 16 (providing, of course, that the portion of the hole to be examined does not have a steel casing) or a gyroscope arranged to serve as a directional reference.

Although scattered neutrons have been mentioned throughout the foregoing as the radiation affecting the counters, scattered gamma radiation and gamma radiation produced by reaction of the neutrons with the atoms of the formation is also contemplated. In the first of these cases the source 22 of Fig. 1 would comprise a source of gamma radiation and the detectors 32 and 44 would be selected for their response to gamma radiation rather than to slow neutrons. The shields 36 or 48 in this case should be formed of lead or some other substance capable of absorbing unwanted gamma radiation. As used throughout the claims which follow, the term "penetrative radiation" is intended to mean the three types of radiation mentioned in this specification, i. e. neutrons and gamma rays scattered from a source or sources in the hole and gamma rays produced in the formations by the reaction of neutrons from a source in the hole with the atoms of the formations.

Obviously many modifications and variations of the invention as hereinbefore set forth, may be made without departing from the spirit and scope thereof, but only such limitations should be imposed as are indicated in the appended claims.

I claim:

1. A method of measuring the dip of an underground formation penetrated by a bore hole which comprises bombarding the formations surrounding a portion of the hole with neutrons from a source in the hole, whereby some of the neutrons are scattered in the formations and returned to the hole substantially in the horizontal plane of said source, and separately measuring the amounts of said scattered, returned neutrons reaching the hole from sectors spaced substantially 120 degrees apart in a generally horizontal direction.

2. A method of measuring the inclination of an underground formation traversed by a bore hole which comprises bombarding the formation surrounding a portion of the hole with neutron radiation from a source in the hole, whereby some of the radiation is scattered in the formations and returned to the hole in the vicinity of said source in substantially the same plane as the bombarding radiation, and separately and simultaneously measuring the intensity of the returned radiation reaching the hole from equally spaced angular sections of the formations.

3. A method of measuring the inclination of an underground formation traversed by a bore hole which comprises bombarding the formations surrounding the hole with penetrative radiation from sources in the hole separated in a vertical direction, whereby some of the radiation is scattered in the formations and returned to the hole in the vicinity of said sources, and separately measuring the amounts of said returned radiation reaching the hole from sectors spaced not more than 120 degrees apart in a direction substantially at right angles to the longitudinal axis of the hole, said sectors being separated in a direction parallel to the hole proportionately to the vertical separation of said sources.

4. A method of measuring the inclination of an underground formation traversed by a bore hole which comprises passing through said hole a neutron source, neutrons from said source being adapted to penetrate the formations surrounding the hole opposite said source from whence a portion of the neutrons scattered therein is slowed down and returned to the hole, separately measuring the amount of said returned neutrons arriving at the hole from each of at least three directions substantially in the horizontal plane of said source by impressing an electrical potential on an ionizable medium of relatively low density and exposing said ionizable medium to the radiations intercepting said drill hole whereby electrical discharges are created in said ionizable medium, the size of the discharges depending on the nature of the received radiation and the number of the discharges being determined by the intensity of the received radiation, and measuring only those discharges whose magnitude is indicative of the fact that they are created by slow neutrons.

5. A method of measuring the inclination of an underground formation traversed by a bore hole which comprises passing through said hole a source of penetrative radiation, radiation from said source being adapted to penetrate the formations surrounding the hole opposite said source from whence a portion of the radiation scattered therein is slowed down and returned to the hole, separately measuring the amount of said returned radiation reaching a point in the hole substantially in the horizontal plane of said source from each of at least three directions by impressing an electrical potential on an ionizable medium of relatively low density and exposing said ionizable medium to secondary radiation which is released by the radiation intercepting said drill hole whereby electrical discharges are created in said ionizable medium, the size of the discharges depending on the nature of the received radiation and the number of the discharges being determined by the intensity of the received radiation, and measuring only those discharges whose magnitude is indicative of the fact that they are originated by the one type of radiation which is to be selected.

6. An apparatus for use in determining the dip of an underground formation traversed by a bore hole comprising a housing adapted to be lowered and raised through said hole, a source of penetrative radiation in said housing, a plurality of detectors in said housing, said detectors being responsive to radiation emitted by said source, scattered in said formation and returned to the hole substantially in the horizontal plane of the source, said detectors being disposed in the same horizontal plane in separated relation about a vertical axis, a shield member cooperating with each detector so that each detector will respond primarily to scattered radiation returned to the hole from a predetermined direction, and means for simultaneously recording the separate outputs of said detectors.

7. An instrument for use in determining the dip of an underground formation traversed by a bore hole comprising a housing adapted to be lowered and raised through said hole, a plurality of detectors in said housing, a source of penetrative radiation located within each of said detectors, each of said detectors being responsive to radiation emitted by its respective source, scattered in said formation and returned to the hole substantially in the horizontal plane of the source, said detectors being disposed in substantial vertical alignment and a shield member cooperating with each detector so that each detector will respond primarily to scattered radiation returned to the hole from a different horizontal direction.

8. An instrument for use in determining the dip of an underground formation traversed by a bore hole comprising a housing adapted to be lowered and raised through said hole, a source of neutrons in said housing, a plurality of detectors in said housing, each of said detectors being capable of translating the radiation scattered in the formation surrounding the hole and returned to the detector substantially in the horizonal plane of the source into electrical discharges, the size of the discharges depending upon the nature of the received radiation and the number of the discharges depending upon the intensity of the received radiation, a shield member adjacent each detector and disposed so that each detector will respond primarily to the radiation returned to the hole from a predetermined different direction, and means for measuring only those pulses whose magnitude is indicative of the fact that they are created by slow neutrons.

GERHARD HERZOG.

REFERENCES CITED

The following references are of record in the file of this patent:

UNITED STATES PATENTS

| Number | Name | Date |
|---|---|---|
| 2,220,509 | Brons | Nov. 5, 1940 |
| 2,302,247 | Meufeld | Nov. 17, 1942 |
| 2,316,361 | Piety | Apr. 13, 1943 |
| 2,322,634 | Howell | June 22, 1943 |
| 2,332,873 | Silverman | Oct. 26, 1943 |
| 2,349,712 | Fearon | May 23, 1944 |